(No Model.)

J. J. SKINNER.
ANIMAL TRAP.

No. 351,808. Patented Nov. 2, 1886.

Witnesses,
J. J. Maloney
L. J. Locke

Inventor,
Joseph J. Skinner,
by Jos. P. Livermore
Att'y.

UNITED STATES PATENT OFFICE.

JOSEPH J. SKINNER, OF BOSTON, MASSACHUSETTS.

ANIMAL-TRAP.

SPECIFICATION forming part of Letters Patent No. 351,808, dated November 2, 1886.

Application filed March 17, 1886. Serial No. 195,535. (No model.)

*To all whom it may concern:*

Be it known that I, JOSEPH J. SKINNER, of Boston, county of Suffolk, State of Massachusetts, have invented an Improvement in Animal-Traps, of which the following description, in connection with the accompanying drawings, is a specification, like letters on the drawings representing like parts.

My invention relates to an animal-trap of that class in which a pair of jaws are actuated by a steel spring to catch the leg of an animal that has stepped between the open jaws and sprung the trap by pressing down upon a trigger or bait-pan between the jaws.

The invention consists, essentially, in a novel construction of the devices by which the trap is set and sprung, the said devices consisting of a dog or pawl connected with one of the jaws and co-operating with a fulcrum-piece on the frame-work of the trap and with the trigger or bait-pan. This combination, in which the dog is pivoted upon and movable with the jaw, has several advantages over the more common arrangement in which the dog is pivotally connected with the frame-work of the trap and extends over the face of the jaw to the trigger inside of the jaw.

Figure 1:
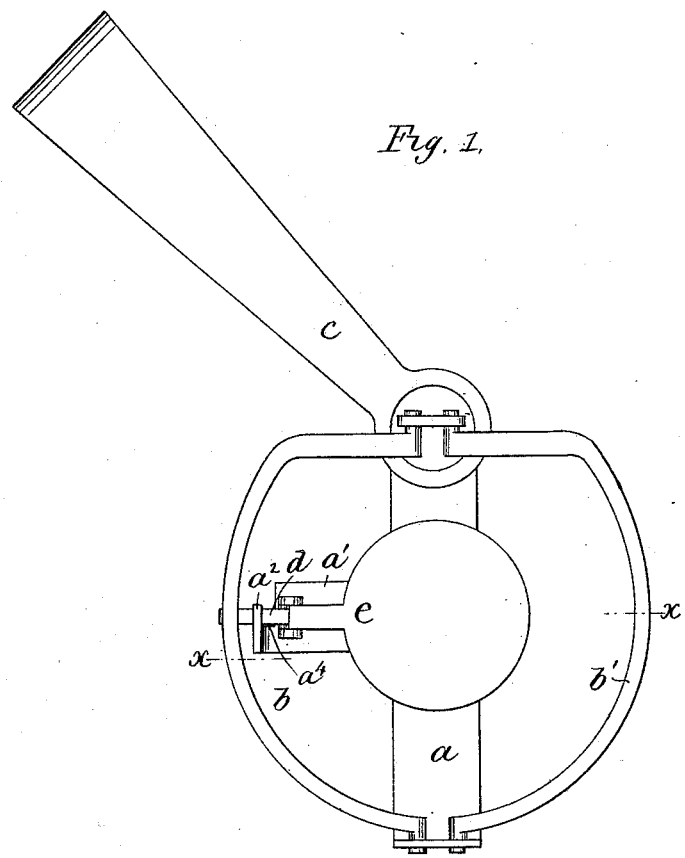
Figure 2:
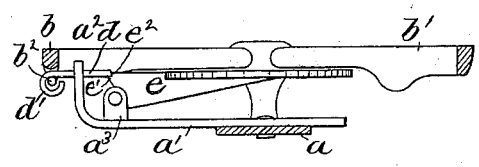
Figure 3:
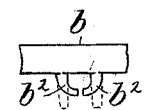

Figure 1 is a plan view of a trap embodying this invention; Fig. 2, a transverse section thereof on line $x\ x$, Fig. 1, showing the trigger and dog in elevation; Fig. 3, a detail showing a portion of the jaw and the means for connecting the dog therewith; and Fig. 4, a modification in which the jaw, trigger, and fulcrum are in a different position with relation to one another from that shown in Figs. 1 and 2.

The main portion of the trap, consisting of the base-plate or frame-work $a\ a'$, the jaws $b\ b'$, pivoted on said frame-work, and the actuating-spring $c$, may all be of usual construction. One of the jaws, $b$, has pivotally connected with it the setting-dog $d$, shown as having an eye or loop, $d'$, by which it may be pivotally connected with the jaw $b$. This pivotal connection may be made, as represented in Fig. 3, by means of projections $b^2$, integral with the jaw $b$, which is usually a malleable casting, which projections may be made straight in the casting, as shown in dotted lines, and then bent, as shown in full lines, into the eye or loop $d'$ of the dog. The cross-piece $a'$ of the frame is provided with a fulcrum-piece, $a^2$, engaged by the dog $d$, the end of which is then held by the trigger $e$, shown as the usual bait-pan pivoted in a post, $a^3$, fastened to the cross-piece, $a'$, of the trap. The fulcrum $a^2$ is preferably made in the upturned end of the cross-piece $a'$, which is preferably provided with a recess, $a^4$, in its side, leaving the fulcrum-piece $a^2$ as a laterally-projecting finger, so that the dog may be engaged with it by a lateral movement into the recess.

As shown in Figs. 1 and 2, the fulcrum $a^2$ lies between the jaw and the trigger, and the upward pressure of the jaw, derived from the spring $c$, thus produces a downward pressure at the point of engagement of the dog and trigger. The dog rests on a shoulder, $e'$, which is a short distance beyond the pivotal axis of the trigger $e$ on the side toward the dog, so that the downward pressure of the dog has a tendency to raise the trigger and bait-pan, which is prevented from moving upward beyond the desired point by the engagement of the shoulder $e^2$ with the end of the dog. A slight downward movement of the trigger will withdraw the shoulder $e'$ from beneath the dog $d$, thus releasing the latter and permitting the jaws to close.

Figure 4:
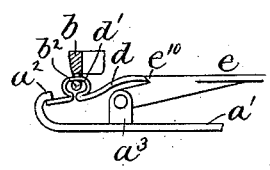

If desired, the fulcrum $a^2$ may be outside the jaw, as shown in Fig. 4, in which case the pressure of the dog on the trigger is upward, and the notch $e^{10}$ of the trigger may be of usual shape.

The eye or loop in the dog is preferably larger than the projection $b^2$ of the jaw that engages it, or is slightly elongated, as shown in Fig. 4, so that it may be readily brought to the proper position with relation to the fulcrum and trigger.

In another application, Serial No. 195,534, I have shown and described a novel construction of the trigger or bait-pan, and have therein illustrated the said bait-pan as co-operating with a dog connected with the jaw, as shown in the present application, in which I do not claim any specific construction of the trigger or bait-pan, or any specific construction of the dog, except that it is attached to and movable with one of the jaws and co-operates with a suitable trigger that controls the movement of the jaw.

I claim—

1. In a trap, the combination of the jaws and their actuating-spring, with a dog attached to and movable with one of the said jaws, and a trigger co-operating therewith, substantially as described.

2. The base-plate or frame-work provided with a fulcrum, combined with the jaws pivoted on the said base-plate, their actuating-spring, the dog attached to and movable with one of the said jaws and co-operating with the said fulcrum, and the trigger co-operating with the said dog, substantially as described.

3. The jaw $b$, having a projection, $b^2$, made integral therewith, combined with the dog connected with the jaw by means of the said projection, substantially as described.

4. The base-plate having the end of the cross-piece turned upward and provided with a lateral recess and finger above the said recess, constituting a fulcrum, combined with the jaw having a dog pivotally connected therewith and the trigger co-operating with the said dog, substantially as described.

In testimony whereof I have signed my name to this specification in the presence of two subscribing witnesses.

JOSEPH J. SKINNER.

Witnesses:
 JOS. P. LIVERMORE,
 H. P. BATES.